Dec. 2, 1952　　　J. M. MALPICA　　　2,620,447
ELECTROSTATIC TRANSFORMER
Filed July 30, 1948
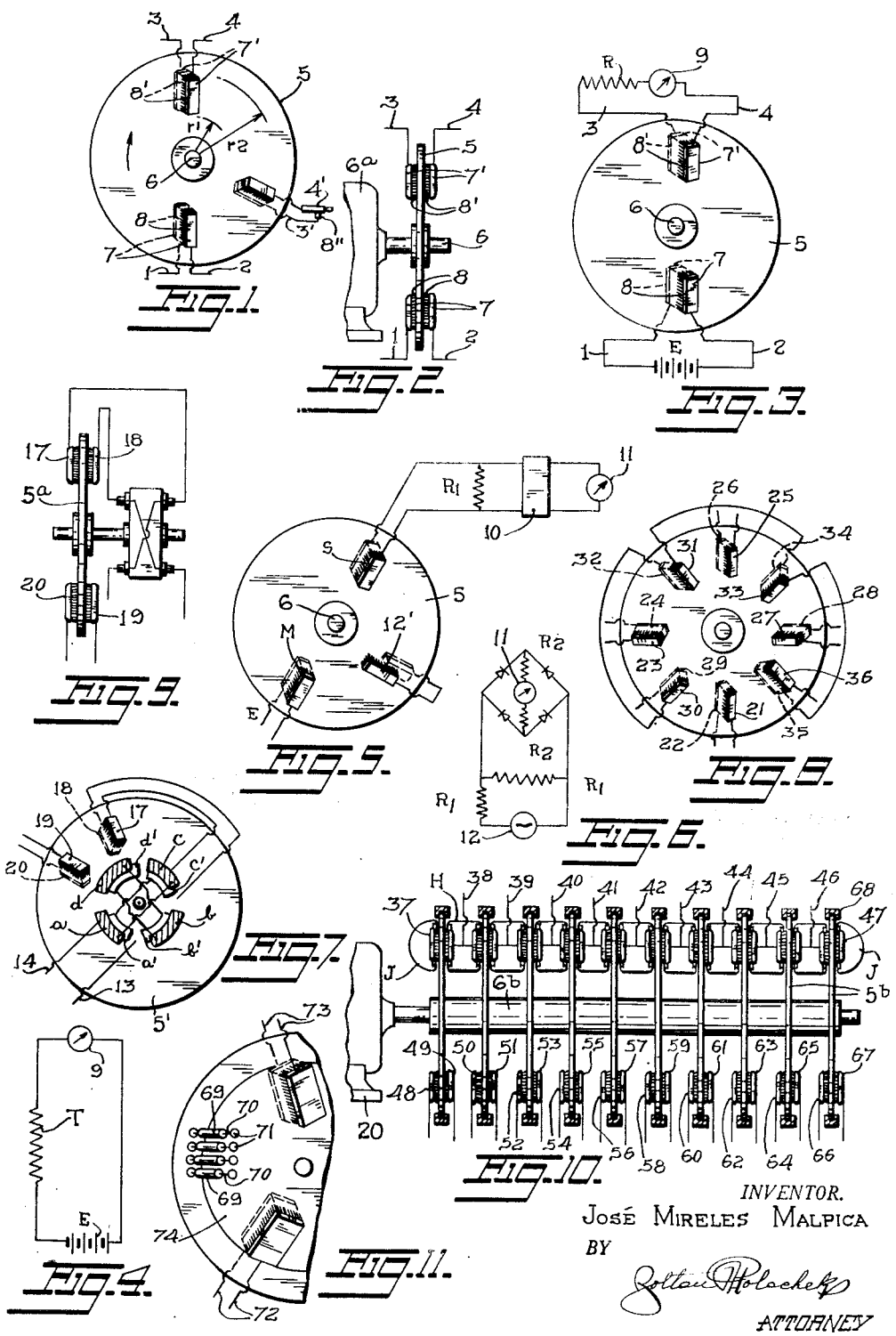
INVENTOR.
JOSÉ MIRELES MALPICA
BY
ATTORNEY Patented Dec. 2, 1952

2,620,447

UNITED STATES PATENT OFFICE 2,620,447

ELECTROSTATIC TRANSFORMER

José Mireles Malpica, Mexico City, Mexico

Application July 30, 1948, Serial No. 41,437
In Mexico November 17, 1947

9 Claims. (Cl. 307—88)

My invention relates to an electrostatic transformer which, by means of a moving dielectric, transfers or transforms electrical energy from the input or primary circuit to the output or secondary circuit, and which is especially adapted to high voltage currents.

The principal object of my invention is to provide arrangements to transmit electrical energy, by means of the polarization of a moving dielectric, from one circuit to another, either to raise the voltage, to lower the voltage, to measure high voltages, or to rectify high voltage alternating currents; and for many other uses.

It is an object of my invention to provide means to effect efficiently the polarization of the dielectric in a way suitable to the intended use of the apparatus.

It is an object of my invention, again, to provide means to remove, partially or totally, the energy stored up in the dielectric, and to use such energy in an efficient and appropriate way.

It is also an object of my invention to provide arrangements to carry out this transformation of electrical energy easily and efficiently, and in a manner suitable to any of the selected uses of which the apparatus is capable.

Other and further objects and advantages will become apparent as the description proceeds.

The basic principle of my invention is the transfer of electrical energy, by the polarization or charge of a moving dielectric, which serves as vehicle to transfer said energy from the input or primary circuit to the output or secondary circuit. The removal of energy occurs by the total or partial depolarization or discharge of the moving dielectric by the output circuit.

The present invention is to be distinguished from proposals directed to provide generators, that is, machines for transforming mechanical energy into electrical energy, as embodied in the now famous Van de Graaff generator very widely used in nuclear research; vide Section 26, Standard Handbook for Electrical Engineers, published in 1941 by Archer E. Knowlton, also Physics Review, 1933, vol. 4, page 145, "The Electrostatic Production of High Voltage for Nuclear Investigations," by Van de Graaff, Compton and Van Atta. The present invention, as already stated, is directed to the provision of a transformer of electrical energy of high voltage; its system essentially involving the inclusion of a primary circuit and a secondary circuit. The moving dielectric may be said to be incidental; the mechanical energy dissipated by the latter is not contemplated to exceed that required to overcome mechanical friction.

The polarization of the moving dielectric is accomplished by making it pass between a pair of conducting brushes, plates, or rollers, which are in intimate electrical contact with the surface of the dielectric, one directly opposite the other, and connected to the terminals of a source of high voltage. If the moving dielectric is in its normal or unpolarized state, during a small interval of time a certain small area passes between the brushes, whose magnitude depends on the length of the brushes and the speed of the dielectric, and the quantity of energy which it removes from the source per unit time is equal to the quantity of energy that would be absorbed by a condenser with the same dielectric, subject to the same potential, and of an area equal to the surface swept by the brushes in that time. An instant afterwards the polarized region passes between another pair of brushes similar to the input brushes where the potential difference of the source appears, except for small losses due to internal conduction or external leakage acting slightly to lower this voltage.

If the output terminals are connected to a current measuring device, this instrument will give a reading proportional to the applied voltage, to the capacity per unit area of the dielectric, and to the speed of the dielectric. It must be pointed out that the input current is equal to the output current plus the small losses, and that with the secondary open the input current corresponds merely to the small losses of the system, in the case of a one to one ratio transformer.

Now, the resemblance between the electrostatic transformer, subject of this invention, and the magnetic transformer, is obvious, each pair of brushes of the first corresponding to a turn of the second. In the electrostatic transformer several thousand volts can be applied between the brushes, but in general with small currents, while in the magnetic transformer for low frequencies, the voltage per turn is low, but the current can be very high. In the electrostatic transformer, a change in the electric field intensity is associated with an electric current, while in the magnetic transformer, a change in the magnetic field intensity is associated with an electro-motive force.

The electrostatic transformer reaches its maximum output when the voltage per pair of brushes nears the puncture potential of the dielectric and when it moves at the maximum speed allowed by its mechanical characteristics. The power rating of the machine depends on the dielectric constant of the material, which can vary from a few units to several thousand for ceramic dielectrics of recent manufacture.

The machine can utilize a flexible dielectric in the form of a band, a rigid dielectric in the form of discs or cylinders, or even liquid or gaseous dielectrics. The machine may work surrounded by a gaseous atmosphere, under high vacuum, or immersed in an insulating liquid, according to the particular needs.

For the purpose of explaining the basic principle of my invention and some of its applications, I have chosen the case of a rigid dielectric in the shape of a disc.

The basic principle of my invention is different from the transformation methods used up to date, that is, that of the magnetic transformer, and although some electrostatic generating machines have rotating discs and moving dielectric bands, the generation of electricity is due to other effects different from mine, and, to my knowledge, the basic principle of my invention has not heretofore been proposed.

The present invention will be understood more readily from the following detailed description when considered in connection with the accompanying drawings and those features of the invention which are believed to be novel and patentable will be pointed out in the claims appended hereto.

In the drawings:

Fig. 1 is a schematic drawing of a single disc, one to one ratio, electrostatic transformer.

Fig. 2 is a schematic edge elevation of certain of the parts shown in Fig. 1.

Fig. 3 is a schematic drawing of a direct current electrostatic transformer voltmeter.

Fig. 4 diagrammatically shows the equivalent circuit.

Fig. 5 shows, also schematically, a possible method to measure high alternating voltages.

Fig. 6 is a diagrammatic view of a related circuit.

Fig. 7 shows schematically a possible method to rectify high alternating voltages.

Fig. 8 is a schematic edge elevation of certain of the parts shown in Fig. 7.

Fig. 9 shows schematically a single disc, step up or step down, electrostatic transformer of direct current, or of alternating current when the disc rotates synchronously at the proper speed.

Fig. 10 shows also schematically a possible arrangement of a multiple disc step up or step down electrostatic transformer.

Fig. 11 is a schematic showing of a condenser type electrostatic transformer.

The description refers to the basic idea and some of the immediate and obvious applications, and are given only as an example to make my claims understandable. Schematic drawings were used because of their simplicity and generality.

Basic electrostatic transformer

In the first embodiment of the present invention shown in Figs. 1 and 2 a suitable rigid dielectric disc 5 is secured to a shaft 6 driven by a suitable variable speed motor, shown partially at 6ª in Fig. 2. The surface of the disc is swept, rubbed or scanned by the conducting brushes, two pairs of brushes 8 and 8' which can touch or can be at a small distance from the disc. The brushes 8 and 8' are mounted on fixed supports 7 and 7', respectively, to which the electrical connections are made. The terminals 1 and 2 connected to the brushes 8 are connected to a source of high voltage, which can be of direct current or alternating current. Terminals 3 and 4 which are connected to the brushes 8' are included in the output or secondary circuit of the electrostatic transformer. The brushes 8 and 8' sweep a circumferential radially extended area which extends from $r_1$ to $r_2$.

This apparatus constitutes the elementary or basic electrostatic transformer of one to one ratio for direct or alternating voltages. The third set of brushes, whose connections 3' and 4' can be left open or shorted, in the latter case as indicated at 8'', is to erase the residual polarization, when needed to do so in the case of variable frequencies.

If a direct current voltage is applied to the input terminals 1 and 2, while the disc is in motion, the region of the disc which passes between the brushes 8 will be polarized or charged, taking energy from the potential source. When the polarized region reaches the output brushes 8', a potential difference will be set up between the brushes, which is equal to the input voltage, minus the small losses. If the secondary circuit is left open, it will not take energy from the dielectric, and when the polarized region passes again between the input brushes 8, it will not take more energy from the source, except to compensate for said small losses. In other words, with the secondary 3—4 open, the disc will take merely inconsiderable energy during the second and subsequent revolutions of a sustained period of rotation thereof.

If a resistance is connected across the secondary circuit, a current will pass through it, just as if the electrostatic transformer were a resistance whose value is proportional to the reciprocal of the capacity per unit area, multiplied by the speed of rotation of the dielectric disc 5. With the secondary in short circuit, the current is limited only by this equivalent internal resistance of the machine. This behavior accounts for the equality between the input and output currents in the 1 to 1 ratio electrostatic transformer.

If an alternating potential is applied across the terminals 1 and 2, and the speed of the disc 5 and the width of the brushes 8 and 8' are appropriate to the frequency of the alternating voltage, said voltage will appear in the terminals 3 and 4. The phase between the primary voltage and the secondary voltage is determined by the time of transit between the primary brushes 8 and the secondary brushes 8', and the frequency of the alternating voltage, so that changing the relative position of the brushes results in changing the relative phase.

For constant frequency alternating currents, the disc must move synchronously at the proper speed in order to avoid residual out of phase polarizations.

For variable frequencies, as already said, a third set of brushes, these shown in Fig. 1 as connected to the terminals 3' and 4', must be used at short circuit to remove or erase the residual polarization.

With ideal lineal brushes, intimate electrical contact thereof with the surface of the dielectric, and sufficiently high speed of the latter, the reproduction of a signal would be distortionless and a faithful reproduction of the primary voltage wave would be obtained, thus providing an insulating signal transformer for specialized uses.

The foregoing explanations cover the basic principles of my invention and its operation.

Direct current electrostatic transformer voltmeter

In Fig. 3, let E represent the voltage to be measured, supposed to be of the order of a few thousand volts. Part 9 is a direct current microammeter or galvanometer, which practically short circuits the secondary. Theoretically, this output current is proportional to the input voltage, the effective capacity per unit area and the speed of rotation of the dielectric disc 5. So, holding the speed constant, the reading of the instrument would be a function of the applied voltage. In practice, the instrument 9 would be properly calibrated.

The advantage of this instrument, over simple resistance in series, resides in its resistance constancy for a given voltage, over a large range of voltages, and the possibility of varying such range, by a simple change in the speed of rotation of the dielectric.

High voltage variable resistance for direct current

It has been previously stated that the equivalent resistance of the elementary or basic electrostatic transformer is inversely proportional to the effective capacity per unit area, multiplied by the speed of the dielectric disc, or, in other words, the equivalent resistance is inversely proportional to the change of capacity per unit time since this quantity can be changed by changing the speed of rotation of the dielectric disc, the elementary electrostatic transformer can be used as a variable high voltage resistance of direct current, as shown in Fig. 4, where, with E the applied voltage, and with the brushes and dielectric disc as in Fig. 3, T is the equivalent resistance.

High voltage variable resistance for alternating current

Reverting to Fig. 1, if the secondary 3—4 is in short circuit, to erase completely the signal, its behavior is exactly as if it were for direct current, and its input resistance can be varied, by changing the speed of rotation of the dielectric disc 5. However, if there is, as indicated at R in Fig. 3, a resistance in series in the secondary circuit, whose value is comparable to the equivalent internal resistance of the machine, it is necessary to use a third set of brushes, as indicated at 3' and 4' in Fig. 1, which are placed in short circuit, and whose purpose is to erase almost completely any residual signal before that region of the dielectric disc 5 reaches the polarizing or input brushes 7. In this case, the electrostatic transformer will act as a resistance, the value of which can be changed by changing the speed of rotation of the disc 5. Thus, if an alternating voltage is applied to the input terminals 1 and 2, and the output terminals 3 and 4 and 3' and 4' are left open, and the disc 5 rotates synchronously at a suitable speed, the equivalent input resistance is very high; but if the disc gets out of synchronism a small amount, the equivalent input resistance will vary periodically, oscillating between practically infinite resistance (except for leakage and losses), and half the direct current resistance for that speed. If the secondary circuit is connected to another similar electrostatic transformer which also can be put out of synchronism, the variation will be superimposed on the first, constituting a double periodic resistance. This process can be continued, in cascade as it were, to obtain a multiple periodic resistance. This type of equivalent resistance may be useful in some research problems.

Alternating current electrostatic transformer voltmeter

In Fig. 5, an alternating voltage E to be measured is applied to the primary M of an electrostatic transformer. The secondary S is connected to a resistance $R_1$ across which there is a small voltage which is rectified by the rectifier 10 and measured by the instrument 11. A third set of brushes 12' in short circuit erases any residual polarization, before a given region of the disc 5 passes again between the M input brushes. With this arrangement the disc need not run synchronously, but at a definite speed for which the instrument was calibrated. The readings of the instrument 11 will be practically proportional to the root-mean square value of the applied voltage, but must be calibrated. By means of suitable shunts not shown, the range of the instrument can be changed.

The advantage of this measuring scheme, over an ordinary resistance resides in the constancy of its resistance characteristics for a given voltage and for reasons of safety, since the electrostatic transformer constitutes an insulating transformer. Fig. 6 shows the equivalent circuit, $R_2$, $R_2$ being resistance elements not shown in Fig. 5, $R_1$, $R_1$ corresponding to $R_1$ of Fig. 5, and 12 representing the electrostatic transformer as in Fig. 5.

Electrostatic rectifier

In Fig. 7, the input brushes 17 and 18 are connected to a suitable mechanical full wave rectifier, which is connected to the source of alternating current through the conductors 13 and 14. The details of the mechanical rectifier are not explained because they are well known to those versed in the electrical art.

By means of the rectifier, the input brushes 17 and 18 impress a fully rectified wave on the dielectric disc 5'. The output brushes 19 and 20 remove part of the energy from the disc for use. The disc 5' is rotated synchronously by a synchronous motor, not shown. In order to obtain a smoother wave, several pairs of input and output brushes can be used, in parallel, but conveniently spaced with respect to phase, and this voltage passed through a suitable filter.

By means of the electrostatic rectifier, very high voltages can be rectified, immersing the apparatus in a suitable medium, such as high vacuum, gas under pressure, or oil.

In Fig. 7, a, $a^1$, b, $b^1$, c, $c^1$, d and $d^1$ are the various parts of a mechanical rectifier interposed in the primary circuit 13—14 ahead of the input or primary brushes 17 and 18.

Alternating current electrostatic transformer

In Fig. 8, the disc rotates one fourth a revolution per cycle of the alternating current. The pairs of brushes (21—22), (23—24), (25—26) and (27—28) are the primary brushes, and are connected in parallel by circuits which are not shown, that is, 21 with 23, and 25 with 27, and 22 with 20, and 26 with 28, while the output or secondary brushes (29—30), (31—32), (33—34), and (35—36) are connected in series as shown in the figure.

In this way, the output voltage is 180° out of phase with respect to the input voltage, but all the output voltages are in phase among themselves, and their values add up, constituting a step-up alternating current transformer. It also can be used as a step down transformer, according to which set of brushes is chosen as the primary.

Direct current electrostatic transformer

In Fig. 9, if a direct current voltage is applied to the input brushes 19 and 20, a direct current voltage will appear in the secondary brushes 17 and 18, working as a step up or step down direct current electrostatic transformer. In this case the disc 5ª does not need to rotate synchronously.

In order to stabilize the voltage, small condensers, not shown in the figure, can be placed across each pair of output brushes.

Multiple disc electrostatic transformer

As shown schematically in Fig. 10, several discs can be fixed in the same shaft. In order to reinforce the discs mechanically, a ring 68 of a suitable material may be fitted to the periphery of each disc. The pairs of input brushes (48—49), (50—51), (52—53), (54—55), (56—57), (58—59), (60—61), (62—63), (64—65) and (66—67) are connected in parallel, that is, 48 with 50, 52, 54, 56, 58, 60, 62, 64 and 66, and 49 with 51, 53, 55, 57, 59, 61, 63, 65 and 67. The output brushes are connected directly in series, as shown, and surrounded by cylindrical corona shields H, from which, respectively, connections 38, 39, 40, 41, 42, 43, 44, 45 and 46 are taken, to be connected to a suitable condenser voltage divider, not shown. Of the outside brushes, the end ones thereof are covered by hemispheres J, from which the end terminals 37 and 47 are taken.

This arrangement is especially suited for extremely high voltages, and the whole apparatus can be immersed in a suitable medium.

This Fig. 10 shows schematically only a set of inputs and outputs diametrically located, but in practice, several sets of inputs and outputs, conveniently located, can be used, to be connected in a way most suitable to the intended use of the apparatus.

The multiple disc electrostatic transformer last above explained may be used for direct currents or for alternating currents, although, for the latter use, the electrostatic discs 5ᵇ must move synchronously to avoid out of phase residual polarization. The discs 5ᵇ are mounted on a shaft 6ᵇ driven by a motor, shown partially at 20 in Fig. 10, which would be a synchronous motor if the machine is used for alternating currents.

In the descriptions of the applications of the electrostatic transformer it has been considered, in order to simplify the explanations, that the dielectric discs were in motion, and the brushes remained stationary. It is obvious that what really matters is a relative motion between the dielectric discs and the brushes, and that it is possible to maintain the dielectric stationary and to move the whole set of brushes, making the electrical connection to the primary and secondary circuits through suitable commutators. This arrangement might be recommended in some special cases.

Condenser type electrostatic transformer

In the basic electrostatic transformer with one primary and one secondary, the secondary current is proportional to the rate of change of capacity per unit time. Referring now to Fig. 11, it is obvious that the continuous dielectric disc can be replaced by a mosiac of many small condensers 69 electrically independent and with their terminals 70 connected to suitable conducting plates 71 with which the primary brushes 72 and secondary brushes 73 make contact, and held in place by a suitable insulating material 74. It would be desirable to use wide brushes with the purpose of charging or discharging many of the condensers 69, at once, which would result in a more uniform current.

As has already been mentioned, it is possible to maintain the condensers stationary, their terminals connected to suitable contacts and to allow the brushes to rotate. This arrangement might be useful when very large currents are needed, requiring a very large rate of change of capacity per unit time. For relatively low voltages this type of electrostatic transformer might be advantageous.

I have herein shown and particularly described certain embodiments of my invention and some of the more obvious applications for the purpose of explaining its principle of operation, but it will be obvious to those skilled in the art, that many modifications and variations are possible and I aim, therefore, to cover all such modifications and variations as fall within the scope of my invention, whose basic principle is the transference or transformation of electrical energy from one circuit to another, by means of a moving dielectric, may it be gaseous, liquid or solid, or a combination of them, and which is defined in the appended claims. In these claims, by a dielectric is meant a dielectric in the form of a disc, cylinder, band or the like, and also a dielectric in solid, liquid or gaseous form, or a combination of these; and by a brush is meant any contactor, as one of brush, plate, roller or suitable other type.

Having thus described my invention, what I claim as new, and desire to secure by United States Letters Patent is:

1. An apparatus for functioning as a transformer of direct or alternating current, that is, for changing the voltage of such current with a corresponding change in the amperage thereof, comprising, in combination, a dielectric, an input or primary circuit including brush means for contacting said dielectric, an output or secondary circuit including brush means also for contacting said dielectric, means for effecting relative movement between said dielectric and both said brush means, supporting means for said brush means to maintain one brush means in such spacing from the other brush means as to polarize or electrostatically charge the dielectric whereby such polarization results in the electrostatic transfer to the output brush means of substantially all the electrical energy received by the dielectric from the input brush means, thus providing an apparatus such that with either direct current or alternating current applied at the input brush means said apparatus in either case functions as a transformer and as a one to one ratio, a step-up or a step-down transformer according to the design of the apparatus, said relative movement effecting means being a means for moving the dielectric relative to said brush means, and short circuited auxiliary brush means for contacting the dielectric for removing or erasing residual polarization thereof, whereby the apparatus may be used as an electrostatic signal transformer to obtain a reproduction of the variations of the primary voltage whether the latter be pulsating, alternating, of variable frequency if alternating, or of variable amplitude.

2. An apparatus for functioning as an electrostatic transformer of direct or alternating current, that is, for changing the voltage of such current with a corresponding change in the amperage thereof, comprising, in combination, a dielectric, an input or primary circuit including brush means for contacting said dielectric, an output or secondary circuit including brush means also for contacting said dielectric, means for effecting relative movement between said dielectric and both said brush means, and supporting means for said brush means to maintain one brush means in such spacing from the other brush means as to polarize or electrostatically charge the dielectric whereby such polarization results in the electrostatic transfer to the output brush means of substantially all the electrical energy received by the dielectric from the input brush means, the second-named brush means being insulated from the first-named brush means, thus to constitute the apparatus as an insulating electrostatic transformer.

3. An apparatus for functioning as an electrostatic transformer of direct or alternating current, that is, for changing the voltage of such current with a corresponding change in the amperage thereof, comprising, in combination, a dielectric, an input or primary circuit including brush means for contacting said dielectric, an output or secondary circuit including brush means also for contacting said dielectric, means for effecting relative movement between said dielectric and both said brush means, and supporting means for said brush means to maintain one brush means in such spacing from the other brush means as to polarize or electrostatically charge the dielectric whereby such polarization results in the electrostatic transfer to the output brush means of substantially all the electrical energy received by the dielectric from the input brush means, said relative movement effecting means being a means for rotating the dielectric relative to the brush means at a speed of rotation which may be varied, whereby, in view of the fact that the equivalent internal resistance of the apparatus is a function of the speed of rotation of the dielectric, the apparatus may constitute a variable high voltage resistance for direct or alternating currents.

4. An apparatus for functioning as an electrostatic transformer of direct or alternating current, that is, for changing the voltage of such current with a corresponding change in the amperage thereof, comprising, in combination, a dielectric, an input or primary circuit including brush means for contacting said dielectric, an output or secondary circuit including brush means also for contacting said dielectric, means for effecting relative movement between said dielectric and both said brush means, and supporting means for said brush means to maintain one brush means in such spacing from the other brush means as to polarize or electrostatically charge the dielectric whereby such polarization results in the electrostatic transfer to the output brush means of substantially all the electrical energy received by the dielectric from the input brush means, each of said brush means incorporating brushes arranged in sets, and there being an auxiliary set of brushes for contacting the dielectric to remove or erase residual polarization thereof, said auxiliary brushes being shorted, and a load indicating device connected to the secondary circuit, said relative movement effecting means being a means for rotating the dielectric relative to all said brushes at a speed of rotation which may be varied, whereby, in view of the fact that the resistance of the apparatus is a function of the speed of rotation of the dielectric and such speed may be varied within wide limits, the apparatus may constitute a high voltage variable resistance for alternating currents.

5. An apparatus for functioning as an electrostatic transformer of direct or alternating current, that is, for changing the voltage of such current with a corresponding change in the amperage thereof, comprising, in combination, a dielectric, an input or primary circuit including brush means for contacting said dielectric, an output or secondary circuit including brush means also for contacting said dielectric, means for effecting relative movement between said dielectric and both said brush means, and supporting means for said brush means to maintain one brush means in such spacing from the other brush means as to polarize or electrostatically charge the dielectric whereby such polarization results in the electrostatic transfer to the output brush means of substantially all the electrical energy received by the dielectric from the input brush means, there being a sensitive current indicating instrument connected to the second-named brush means, whereby, with the readings of said instrument taken in terms of the primary voltage, the apparatus may constitute a direct current voltmeter.

6. An apparatus for functioning as an electrostatic transformer of direct or alternating current, that is, for changing the voltage of such current with a corresponding change in the amperage thereof, comprising, in combination, a dielectric, an input or primary circuit including brush means for contacting said dielectric, an output or secondary circuit including brush means also for contacting said dielectric, means for effecting relative movement between said dielectric and both said brush means, and supporting means for said brush means to maintain one brush means in such spacing from the other brush means as to polarize or electrostatically charge the dielectric whereby such polarization results in the electrostatic transfer to the output brush means of substantially all the electrical energy received by the dielectric from the input brush means, thus providing an apparatus such that with either direct current or alternating current applied at the input brush means said apparatus in either case functions as an electrostatic transformer and as a one to one ratio, a step-up or a step-down transformer according to the design of the apparatus, said relative movement effecting means being a means for moving the dielectric relative to said brush means, there being auxiliary brush means for contacting the dielectric for removing or erasing residual polarization thereof, a rectifier in the secondary circuit, and also in said circuit an indicating instrument, whereby, with alternating current applied at the primary circuit and with said instrument calibrated in terms of the primary voltage, the apparatus may constitute an alternating current voltmeter.

7. An electrostatic transformer which comprises, in combination, a plurality of spaced parallel dielectric discs mounted on a rotative shaft to turn in unison, means for rotating said shaft to rotate said discs at a suitable speed, sets of pairs of input brushes, sets of pairs of output brushes, which are conveniently connected to add their voltages, cylindrical corona shields surrounding said output brushes, means to interconnect the sets of primaries and the sets of secondaries as needed, means to diminish losses by confinement relative to a suitable medium, and means to connect the partial secondary voltages to a suitable condenser voltage divider, said rotating means being a synchronous rotating means, constituting in this way a universal, that is, direct current and alternating current, step-up or step-down high voltage electrostatic transformer.

8. A set of power electrostatic transformers, using dielectrics of extremely high dielectric constant, to transmit electrical energy at high voltages of direct current from a generating plant to a distributing center, receiving its energy from suitable generating equipment, and distributing it either as direct current, or as alternating current, as desired.

9. An apparatus for functioning as an electrostatic transformer of direct or alternating current to change the voltage of the current with a corresponding change in the amperage thereof, comprising a dielectric, an input or primary circuit including a brush means having wire bristles, means for charging said dielectric by direct contact of said wire bristles with said dielectric, but mainly by means of the conducting ionized air which is formed in the regions where the intensity of the electric field is sufficiently high to ionize the air, an output or secondary circuit including a brush means having wire bristles also contacting said dielectric, means for effecting relative movement between said dielectric and both said brush means, and supporting means for said brush means to maintain one brush means in such spacing from the other brush means as to polarize or electrostatically charge said dielectric, so constructed and arranged that such polarization results in the electrostatic transfer to said output brush means of substantially all the electrical energy received by said dielectric from the input brush means providing an apparatus in which either direct or alternating current, if the dielectric moves synchronously with the alternating current, may be applied at the input brush means so that the apparatus in either case will function as a one to one ratio, a step-up or a step-down electrostatic transformer depending on the design thereof.

JOSÉ MIRELES MALPICA.

REFERENCES CITED

The following references are of record in the file of this patent:

UNITED STATES PATENTS

| Number | Name | Date |
|---|---|---|
| 1,600,842 | Philips | Sept. 21, 1926 |
| 1,694,966 | Clinker | Dec. 11, 1928 |
| 2,523,689 | Felici | Sept. 26, 1950 |